United States Patent
Taylor et al.

(10) Patent No.: US 8,680,383 B1
(45) Date of Patent: Mar. 25, 2014

(54) ELECTRONIC HYMNAL SYSTEM

(76) Inventors: Henry P. Taylor, Brooklyn, NY (US);
Callen Grant, Brooklyn, NY (US)

(*) Notice: Subject to any disclaimer, the term of this patent is extended or adjusted under 35 U.S.C. 154(b) by 12 days.

(21) Appl. No.: 13/591,452

(22) Filed: Aug. 22, 2012

(51) Int. Cl.
*G09B 15/02* (2006.01)

(52) U.S. Cl.
USPC .......................................... 84/477 R

(58) Field of Classification Search
USPC ............................................. 84/477 R, 470 R
See application file for complete search history.

(56) References Cited

U.S. PATENT DOCUMENTS

| | | | | |
|---|---|---|---|---|
| 5,400,687 A * | 3/1995 | Ishii | ............................. | 84/477 R |
| 5,728,960 A * | 3/1998 | Sitrick | ......................... | 84/477 R |
| 5,760,323 A * | 6/1998 | Romero et al. | ............. | 84/470 R |
| 6,051,769 A * | 4/2000 | Brown, Jr. | .................... | 84/477 R |
| D428,044 S * | 7/2000 | Cullum, Jr. | .................... | D17/99 |
| 6,084,168 A | 7/2000 | Sitrick | | |
| 6,156,964 A * | 12/2000 | Sahai et al. | ................. | 84/470 R |
| 6,392,132 B2 * | 5/2002 | Uehara | ........................ | 84/477 R |
| 6,809,246 B2 * | 10/2004 | Errico | .......................... | 84/477 R |
| 7,041,890 B1 * | 5/2006 | Sutton | ......................... | 84/477 R |
| 7,064,261 B2 * | 6/2006 | Shao | ............................. | 84/477 R |
| 7,297,856 B2 * | 11/2007 | Sitrick | ........................ | 84/477 R |
| 7,375,273 B2 * | 5/2008 | Sawyer-Kovelman et al. | . | 84/609 |
| 7,488,886 B2 * | 2/2009 | Kemp | ............................ | 84/609 |
| 7,579,541 B2 * | 8/2009 | Guldi | .......................... | 84/470 R |
| 7,888,578 B2 * | 2/2011 | Guo et al. | ....................... | 84/609 |
| 7,962,530 B1 * | 6/2011 | Kolta | ............................ | 707/805 |
| 8,431,809 B1 * | 4/2013 | Chan et al. | ................... | 84/483.2 |
| 8,536,437 B2 * | 9/2013 | Katsuta | ....................... | 84/477 R |
| 2001/0037719 A1 * | 11/2001 | Gardner et al. | ................ | 84/478 |
| 2005/0103187 A1 * | 5/2005 | Bodlaender | ...................... | 84/609 |
| 2005/0204889 A1 * | 9/2005 | Swingle et al. | ................. | 84/100 |
| 2008/0196575 A1 | 8/2008 | Good | | |

* cited by examiner

*Primary Examiner* — Robert W Horn (57) ABSTRACT

An electronic hymnal system comprises a music stand and a hymnal display. The display is capable of playing the hymns to let users get familiar or practice the hymns while viewing the scores and lyrics in different zoom level according to user's preference. The device comprises a touch screen on the front of the device, a power ON/OFF button, a SD card slot, a disk input slot, a front cover attached to the device, a battery compartment, an earphone port, volume control button and battery charge port. The user can disable the function of playing the hymns, only review the score and lyrics in a group gathering situation.

17 Claims, 8 Drawing Sheets

(ISO View)

FIG. 1
(ISO View)

FIG. 2
(ISO View)

FIG. 3
(Bottom View)

FIG. 4
(Front View)

FIG. 5
(Side View)

FIG. 6

FIG. 7
(Alternative Embodiment)

FIG. 10
(ISO View of Bluetooth Ear Piece)

ELECTRONIC HYMNAL SYSTEM

BACKGROUND OF THE INVENTION

The present invention is directed to an electronic hymnal system with a display disposed on a music stand to display the music score and song lyrics. Specifically, the electronic hymnal can synchronize the displaying song scores and lyrics on touch screen with external hymn sound during a group gathering.

The Hymnal is a collection of hymns usually in the form of a book used in various situations such as religious gatherings, chorus, etc. The traditional hardcopy hymnal only shows music scores and song lyrics with one printing size thus causing inconvenience for users not familiar with the songs or different preference of printing size. Hence, there is a need for a hymnal that can display the songs on screen with synchronization to the music sound. It's also preferable that the hymn scores and lyrics can be displayed with various sizes to meet different needs of various users.

Moreover, the hardcopy hymnals typically contain hundreds of songs and thus are heavy for people especially senior people to hold for a long time during group singings. An electronic hymnal is much lighter and more suitable and convenient to carry and faster to locate the page of the hymns to be sung.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENT

Referring now to FIG. 1-10, the present invention features an electronic hymn system 100 comprising a music stand 110, an electronic hymnal display 120 for the use of reviewing the hymn score and lyrics with preferred display size and listening to the hymns for practice and an optional remote controller 250. The hymnal display 120 has a touch screen 121, a power ON/OFF button 130, SD card slot 140, a disk input slot 150, a protection cover 160, a battery compartment 170, an earphone plug port 180, volume control button, a speaker 190, a battery charge port 195.

Figure 1:
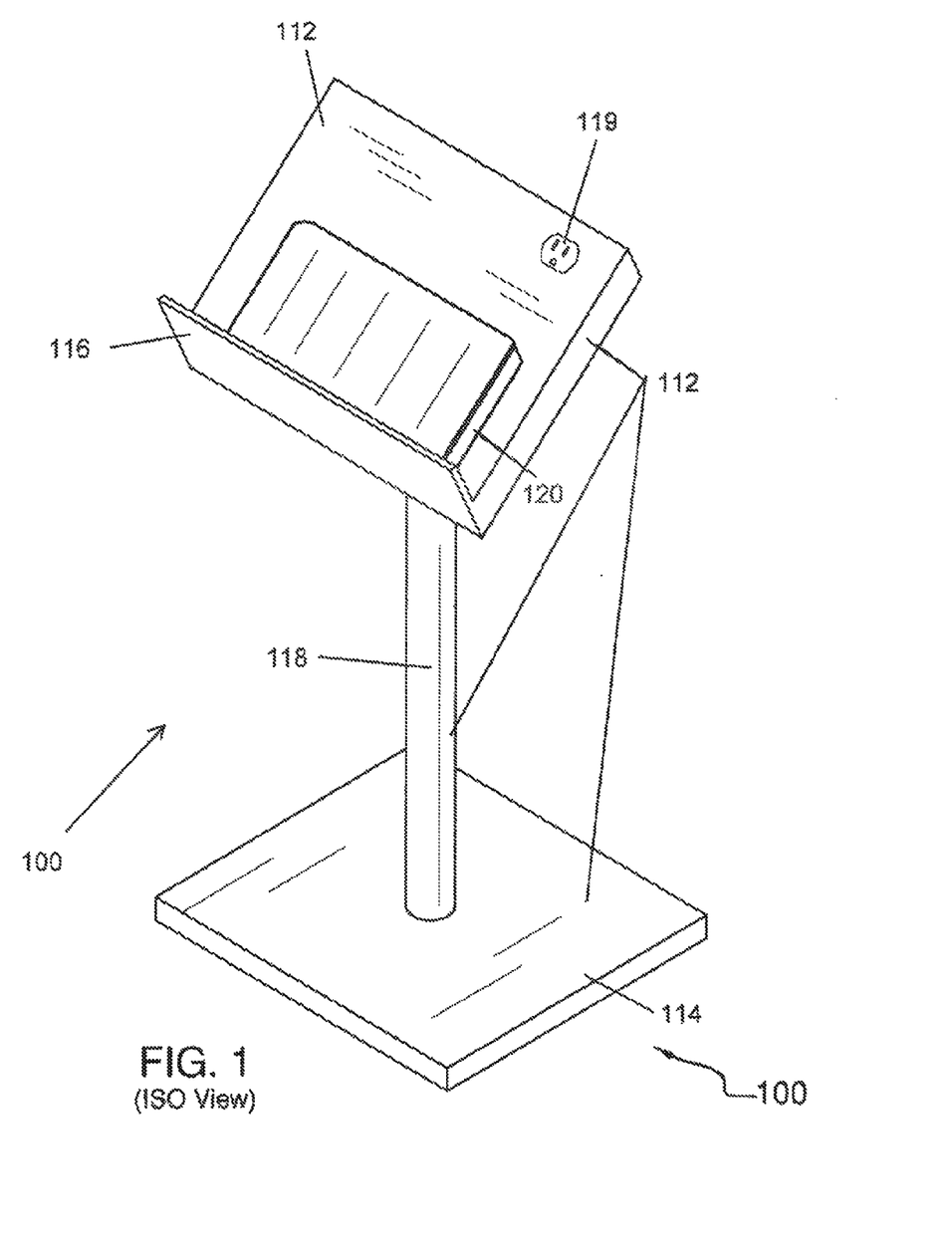
FIG. 1 shows a perspective view of an electronic hymnal system with a music stand and an electronic hymnal display.
Figure 2:
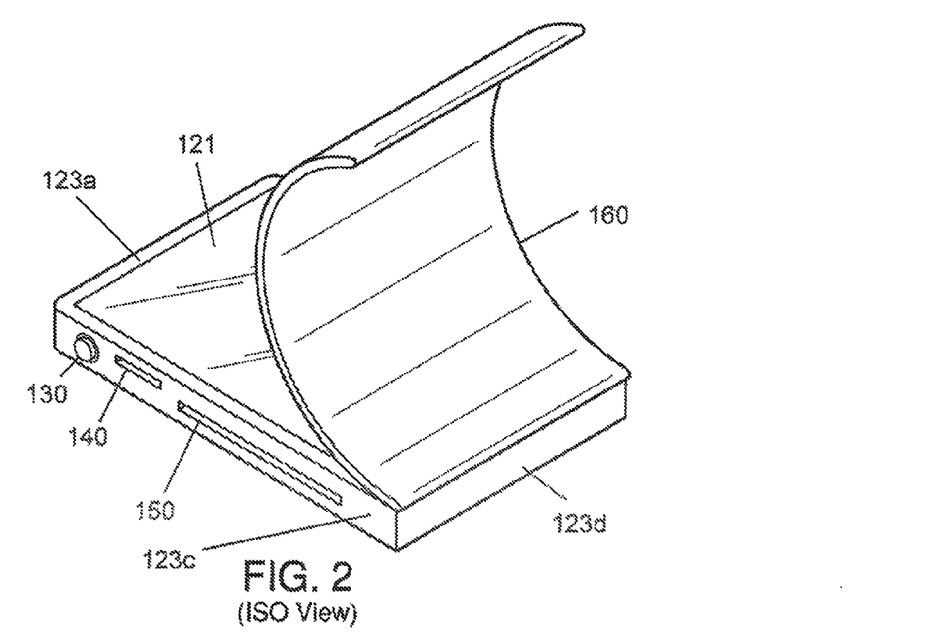
FIG. 2 shows a perspective view of an electronic display.
Figure 3:
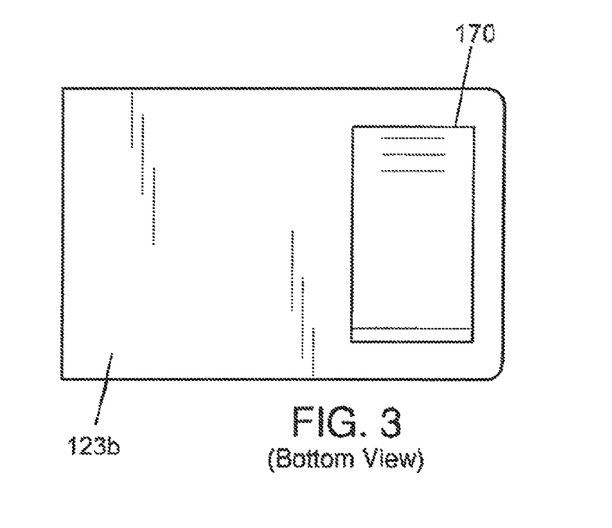
FIG. 3 shows a bottom view of an electronic display.
Figure 4:
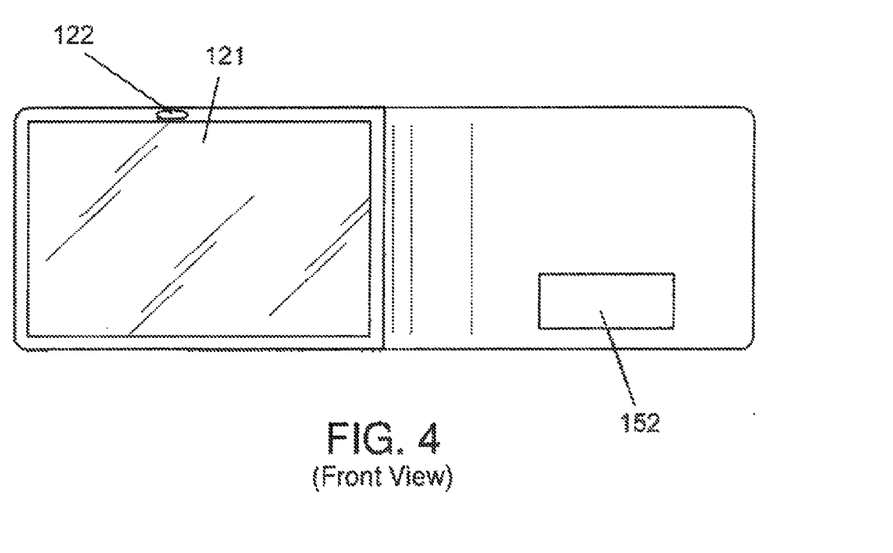
FIG. 4 shows a front view of an electronic display.

The music stand 110 is a conventional stand with an inclined surface 112, a height-adjustable leg 118 and a base 114, wherein the inclined surface has an adjustable angle. The inclined surface 112 has a strap 116 to prevent the display 120 from sliding down when placed on an angle. In some embodiments, the music stand has a built-in charge port 119. The ports can be a 110 Voltage outlet, a low voltage DC port, or a USB port.

An electronic display 120 is disposed on said inclined surface of said music stand; wherein the display is a rectangular cuboid with a top surface (123a), bottom surface (123b), first side surface (123c), second side surface (123d), third side surface (123e) and fourth side surface (123f). The display further comprises a touch screen 121 disposed on said front of the device to display hymn scores and lyrics, a microphone 122 disposed on said front of the device to receive an audio signal input, a power ON/OFF button 130 disposed on said first side surface to turn on or off the display, a first battery compartment 170 disposed on said bottom surface, wherein one or a plurality of batteries reside inside to provide power to the display, an electronic storage 172 disposed inside the display as a storage piece for hymn music scores and lyrics, a receiver 174 disposed inside the display and a display microprocessor disposed inside the display, wherein the display microprocessor is operatively connected to said touch screen, microphone, battery compartment, storage, power ON/OFF button and receiver.

Figure 9:
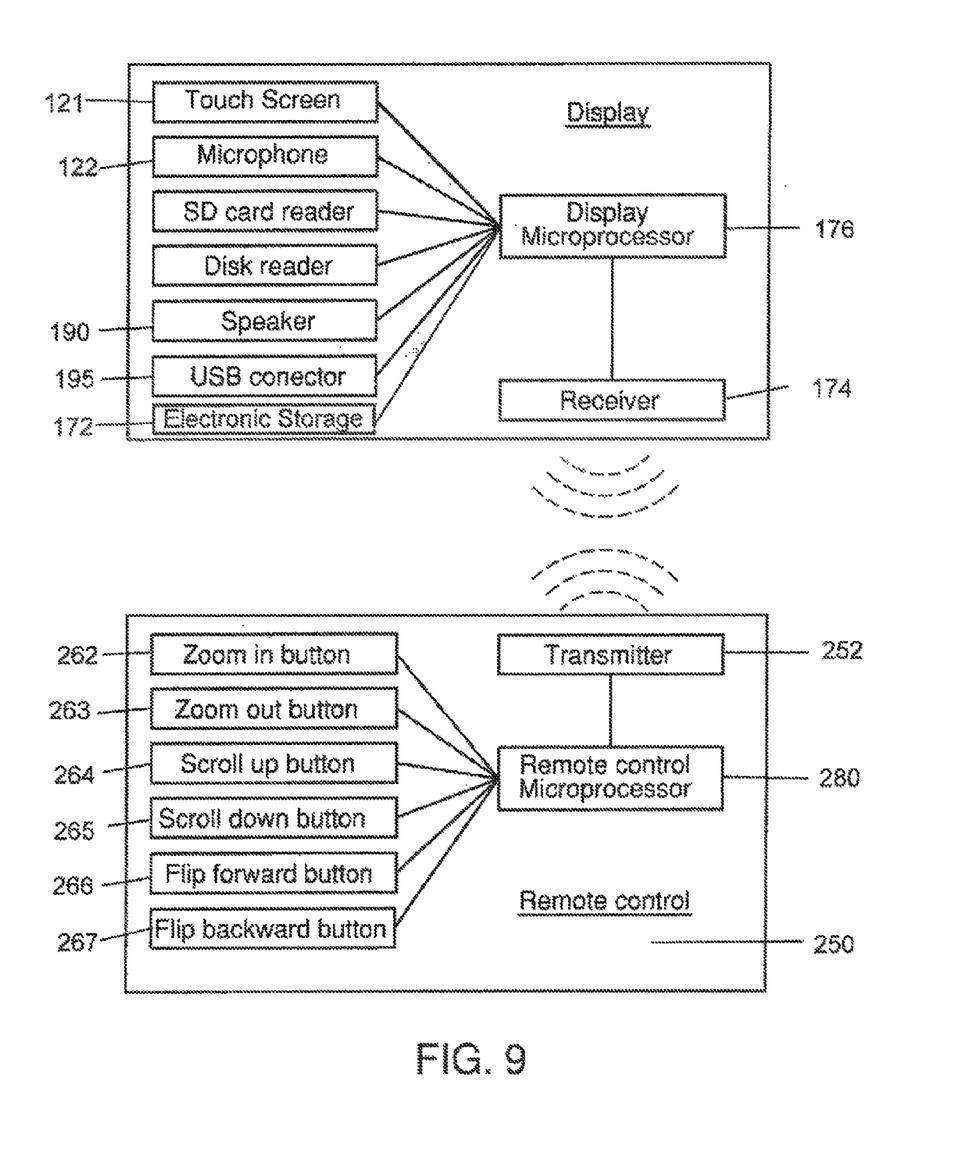
FIG. 9 shows a block diagram of the display and remote controller.

The display microprocessor 176 is configured to receive an audio input from said microphone during a music session of group gathering, analyze the audio characteristics of the input, compare to the stored hymn scores within said storage, and find a best match within the storage, present the best match to the touch screen. When the music or singing session of a group gathering starts, the microphone will pick up the music signal, the signal is sent to the display microprocessor for analysis to extract the audio characteristics, which are then compared to the stored song lyrics and scores for match searching. Once a match is found, the matched song lyrics and scores will be displayed on the touch screen with a default display size.

Figure 7:
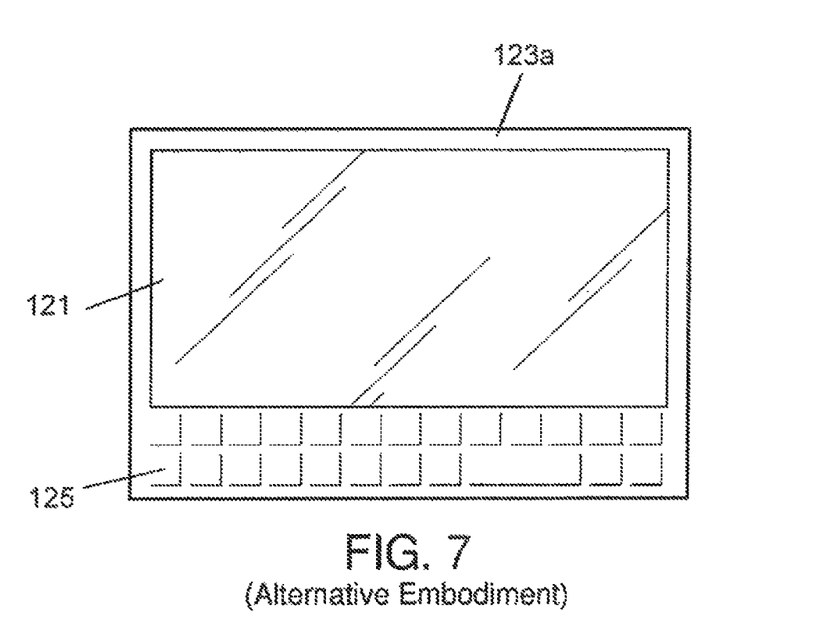
FIG. 7 shows an alternative embodiment of the touch screen.

The touch screen 121 can occupy the whole front side of the hymnal or alternatively part of the front side and thus leave space for a physical keyboard 125 as input means. The touch screen displays the hymn scores and lyrics. The user can adjust the zoom level via command input through touch screen or keyboard input according to his/her preferences. For example, the user can adjust the display zoom level, scroll up or down the display content and flip forward or backward displaying pages via certain of keys or gestures.

Figure 8:
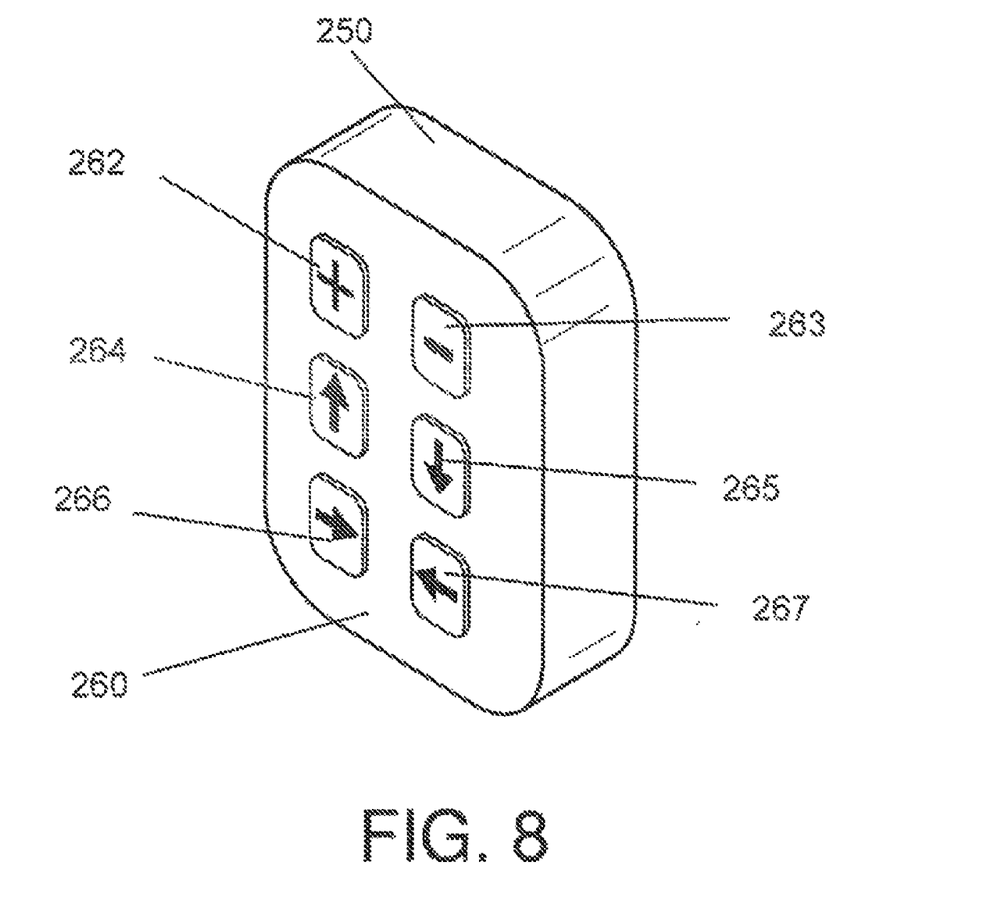
FIG. 8 shows a perspective front view of a remote controller.
Figure 8A:
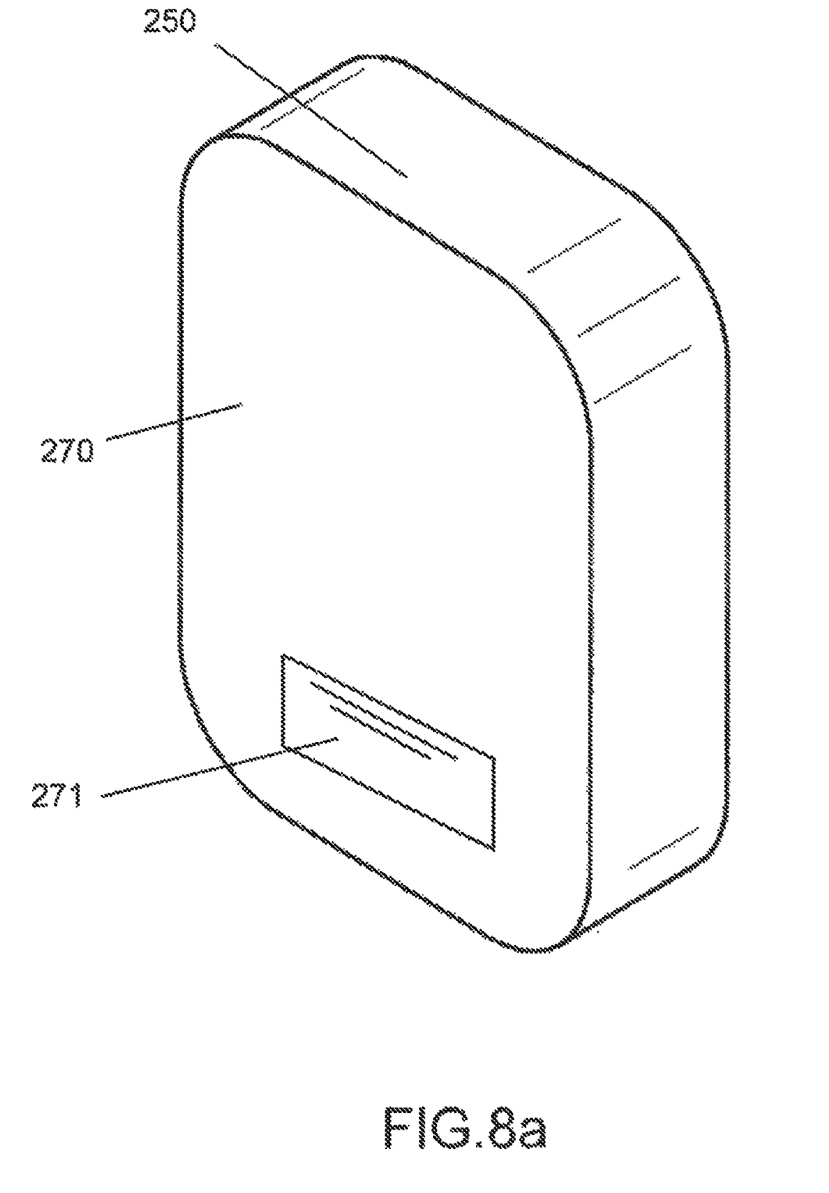
FIG. 8a shows a perspective back view of a remote controller.

In some embodiments, the user can control the display via a remote controller 250. The remote controller has a top surface 260 and back surface 270, the remote comprising a transmitter disposed inside the remote controller, wherein said receiver is configured to receive signals from the transmitter; a zoom-in button 262, a zoom-out button 263, a scroll-up button 264, a scroll-down button 265, a flip-forward button 266; a flip-backward button 267 wherein all the buttons are disposed on the top surface; a second battery compartment 271 disposed on the bottom surface of the remote control, wherein one or a plurality of batteries reside inside to provide power to the remote control, a remote control microprocessor operatively connected to each of the transmitter, zoom-in button, zoom-out button, scroll-up button, scroll-down button, flip-forward button and flip-backward button.

The remote control microprocessor 280 is configured to receive input signal from a zoom-in button (262), a zoom-out button (263), a scroll-up button (264), a scroll-down button (265), a flip-forward button (266), a flip-backward button (267). Whereupon the remote control microprocessor generates an output command of zoom-in, zoom-out, scroll-up, scroll-down, flip-forward or flip-backward to the transmitter 282, the transmitter then sends a corresponding transmitter signal to the display receiver 174.

When the display receiver receives signal of zoom-in, zoom-out, scroll-up, scroll-down, flip-forward or flip-backward from the said remote controller transmitter, the corresponding signals are forwarded to the display microprocessor, whereupon the microprocessor generates an output command to the touch screen to zoom-in, zoom-out, scroll-up, scroll-down, flip-forward or flip-backward the hymn songs and lyrics on the screen In some embodiments, a protection cover 160 is bonded with the hymnal permanently or removably as a protection for the touch screen and also a front cover similar to a book front cover. In some embodiments, the outside of the front cover is embedded with a manufacturer logo or other manufacturer information. The inside of the front cover is optionally disposed with a signature area 152 where the user can write down his/her own information such as name, signature, etc.

Figure 5:
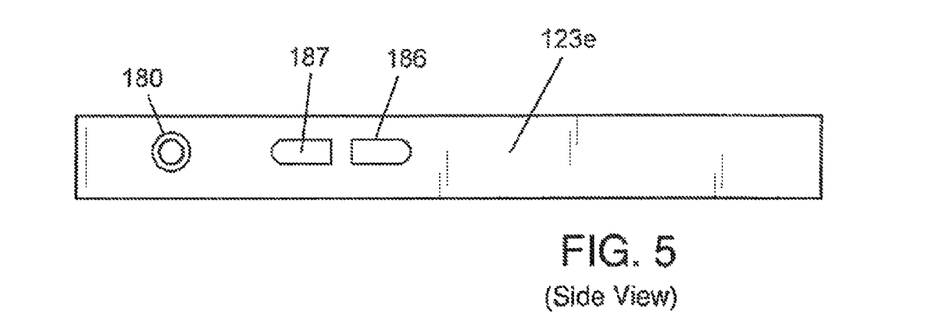
FIG. 5 shows a side view of an electronic display.

In some embodiments, the display further comprises an SD card reader/writer with a card input slot disposed on a side surface (123c) of said display, wherein the display microprocessor is operatively connected to said SD card reader/writer. The SD card slot 140 can take SD card, miniSD, microSD, flash card or other non-volatile memory card format for use in portable devices. The display microprocessor is operatively connected to said SD card reader/writer; wherein the microprocessor is configured to receive input signal from SD card reader, update hymn scores and lyrics stored in said internal memory with additional hymn scores and lyrics stored in the external card, transfer hymn scores and lyrics stored in said internal memory to external card via said card reader/writer. The user may also transfer the data from those cards into internal memory for his/her own records. Preferably, the cards are in a mini-disk size to reduce the overall size of the hymnal.

In some embodiments, the display further comprises an optical disk reader/writer with a disk input slot (150) disposed on a side surface (123c) of said display, wherein the display microprocessor is operatively connected to said optical disk reader/writer; wherein the microprocessor is configured to receive input signal from the optical disk reader/writer, update hymn scores and lyrics stored in said internal memory with additional hymn scores and lyrics stored in the external optical disk, transfer hymn scores and lyrics stored in said internal memory to external optical disk via said optical disk reader/writer. The optical disk reader/writer can read or write standard 120 mm CD or DVD, or 80 mm mini CD or DVD. Preferably, the disks are in a mini-disk size to reduce the overall size of the hymnal.

Figure 6:
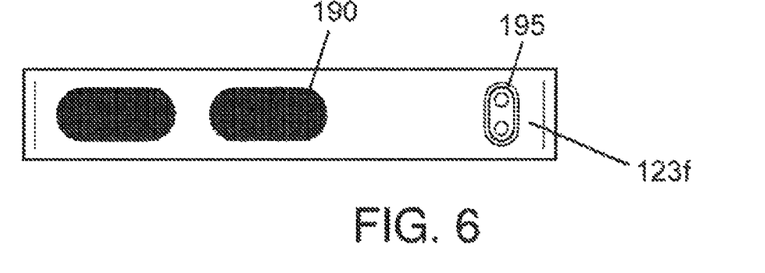
FIG. 6 shows another side view of en display.

In some embodiments, an earphone plug port 180 and volume control buttons are disposed on the fourth side edge (123f) of the display 120. The volume control button can be one piece with touch buttons on both ends of the piece or two pieces with one piece 187 increasing volume and one piece 186 decreasing volume. The volume can be muted by pressing the decreasing volume piece 186 certain times. In some embodiments, the user can disable the playing function while reviewing the hymns only at some situations such as group gatherings.

In some embodiments, a mini-speaker 190 and battery charge port 195 are disposed together on third side surface (123e) of the display 120. The speaker can be a single piece or a plurality of mini-speakers. The charge port 195 can be a standard portable electronic charge port or USB port, which can also function as a communication link to external devices such as computers, smartphones, or another hymnal to transfer data between each other. Charge ports of this nature are well known to one of ordinary skill in the art.

Figure 10:
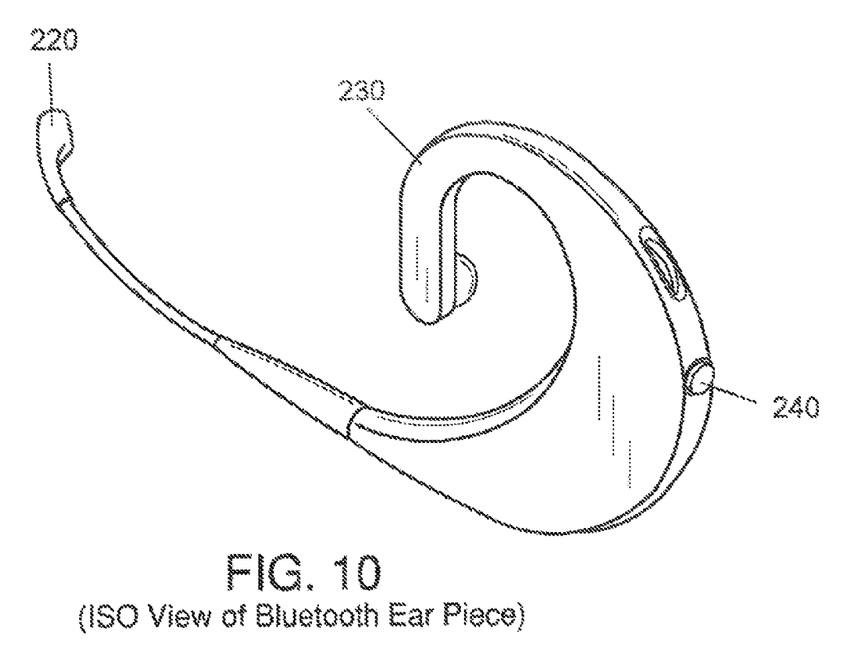
FIG. 10 shows a perspective view of Bluetooth earphone.

In some embodiments, the display has a built-in Bluetooth communication module to communicate with external Bluetooth devices such as Bluetooth headphone, wherein the Bluetooth communication module are operatively connected to the display microprocessor. The Bluetooth headphone, as shown in FIG. 10, has microphone 220 to receive user's voice input, earphone stud 230 to listen to the hymn being played, and a power ON/OFF button 240. Bluetooth earphone of this nature is well known to one of ordinary skill in the art.

The disclosures of the following U.S. patents are incorporated in their entirety by reference herein: U.S. Patent Application Publication No. 2008/0196575, U.S. Design Pat. No. 28044, U.S. Pat. No. 6,084,155, U.S. Pat. No. 7,041,890, U.S. Pat. No. 7,888,578 and U.S. Patent Application No. 2001/0037719.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. An electronic hymnal system (100) capable of displaying hymn scores and lyrics via remote control to synchronize with hymn music played during a group gathering, the system comprising:
   (a) a music stand (110) with an inclined surface (112), a height-adjustable leg (118) and a base (114), wherein the inclined surface has adjustable angle, wherein a strap (116) is disposed at bottom edge of the inclined surface (112);
   (b) a display (120) disposed on said inclined surface of said music stand; wherein the display is a rectangular cuboid with a top surface (123a), bottom surface (123b), first side surface (123c), second side surface (123d), third side surface (123e) and fourth side surface (123f); the display further comprising:
      (i) a touch screen (121) disposed on said front surface (123a) of the device to display hymn scores and lyrics;
      (ii) a microphone (122) disposed on said front surface (123a) of the device to receive audio signal input;
      (iii) a power ON/OFF button (130) disposed on said first side surface (123c) to turn on or off the display;
      (iv) a first battery compartment (170) disposed on said bottom surface (123b), wherein one or a plurality of batteries reside inside to provide power to the display;
      (v) an electronic storage (172) disposed inside the display as storage place for hymn music scores and lyrics;
      (vi) a receiver (174) disposed inside the display; and (vii) a display microprocessor (176) disposed inside the display, wherein the display microprocessor is operatively connected to said touch screen, microphone, battery compartment, storage, power ON/OFF button and receiver;

(c) a remote controller (250) wherein the remote controller has a top surface (260) and bottom surface (270), the remote comprising:

(i) a transmitter (252), wherein said receiver is configured to receive signals from the transmitter;

(ii) a zoom-in button (262), a zoom-out button (263), a scroll-up button (264), a scroll-down button (265), a flip-forward button (266), a flip-backward button (267), wherein all the buttons are disposed on the top surface (260);

(iii) a second battery compartment (271) disposed on the back surface (270) of the remote control, wherein one or a plurality of batteries reside inside to provide power to the remote control;

(iv) a remote control microprocessor (280) operatively connected to each of the transmitter (282), zoom-in button, zoom-out button, scroll-up button, scroll-down button, flip-forward button and flip-backward button;

wherein:

the remote control microprocessor is configured to receive input signal from zoom in button, zoom out button, scroll up button, scroll down button, flip forward button or flip backward button, whereupon the remote control microprocessor generates an output command of zoom-in, zoom-out, scroll-up, scroll-down, flip-forward or flip-backward to the transmitter, the transmitter then sends a corresponding transmitter signal to the display receiver; and the display microprocessor is configured to receive an audio input from said microphone during a music session of group gathering, analyze the audio characteristics of the input, compare the stored hymn scores within said storage, find a best match within the storage, present the best match to the touch screen; wherein said display receiver is configured to receive signal of zoom in, zoom out, scroll up, scroll down, flip forward or flip backward from said remote controller transmitter, forward the received signal to the display microprocessor, whereupon the microprocessor generates an output command to the touch screen to zoom in, zoom out, scroll up, scroll down, flip forward or flip backward the hymn songs and lyrics on the screen.

2. The system of claim 1, wherein the display (120) includes a front cover (160) permanently or removably attached to the device.

3. The system of claim 2, wherein the outside of the front cover contains logo of the manufacturer.

4. The system of claim 2, wherein the inside of the front cover contains a signature area (152) where the user can put his/her signature and/or name.

5. The system of claim 1, wherein one or a plurality of mini-speakers (190) are also disposed on the fourth side surface (123*f*) of the display, wherein the display is configured to play music audio or video files with the audio output to the speakers.

6. The system of claim 1, wherein the display (120) further composes an earphone port (180) disposed on the third side surface (123*e*) of the display, wherein the display is configured to play music audio or video files with the audio output to an external earphone through the earphone port, wherein the display (120) further comprises volume control buttons on the third side surface (123*e*) of the display, wherein volume control buttons (187) is pressed to increase volume and volume control button (186) is pressed to decrease volume, wherein the volume can be muted by pressing the decreasing volume piece (186) certain times.

7. The system of claim 1, wherein the display (120) further comprises the battery charge port (195) disposed on the fourth side surface (123*f*) of the display, wherein the battery of the display is operatively connected to the charge port and recharged by external power supply through said charge port.

8. The system of claim 7, wherein the battery charge port is also a USB port, wherein the USB port is a date transfer link via USB cable between the device and external devices such as computer, smartphone, or another electronic hymnal device.

9. The system of claim 8, wherein the USB port is a regular USB port or mini-USB port.

10. The system of claim 1, wherein said music stand has a built-in power charge port (119) for said display.

11. The system of claim 1, wherein display (120) further comprises an SD card reader/writer with a card input slot (140) disposed on a side surface (123*a*) of said display, wherein the display microprocessor is operatively connected to said SD card reader/writer; wherein the microprocessor is configured to receive input signal from SD card reader, update hymn scores and lyrics stored in said internal memory with additional hymn scores and lyrics stored in the external card, transfer hymn scores and lyrics stored in said internal memory to external card via said card reader/writer.

12. The system of claim 10, wherein the card reader/writer can read or write SD card, MiniSD card, Flash card, microSD card.

13. The system of claim 1, wherein display further comprises an optical disk reader/writer with a card input slot (150) disposed on a side surface (123*a*) of said display, wherein the display microprocessor is operatively connected to said optical disk reader/writer; wherein the microprocessor is configured to receive input signal from optical disk reader/writer, update hymn scores and lyrics stored in said internal memory with additional hymn scores and lyrics stored in the external optical disk, transfer hymn scores and lyrics stored in said internal memory to external optical disk via said optical disk reader/writer.

14. The system claim 12, wherein the optical disk reader/writer can read or write standard Compact Disk (CD) or Digital Video Disk (DVD), or mini CD or DVD.

15. The system of claim 1, wherein the display (120) further comprises a built-in Bluetooth communication module to communicate with external Bluetooth devices, wherein the Bluetooth communication module are operatively connected to said display microprocessor.

16. The system of claim 15, wherein the external Bluetooth device is a Bluetooth earphone.

17. An electronic hymnal system (100) capable of displaying the hymn scores and lyrics via remote control to synchronize with hymn music played during a group gathering, the system comprising:

(a) a display (120), wherein the display is a rectangular cuboid with a top surface (123*a*), bottom surface (123*b*), first side surface (123*c*), second side surface (123*d*), third side surface (123*e*) and fourth side surface (123*f*); the display further comprising:

(i) a touch screen (121) disposed on said front surface (123*a*) of the device to display hymn scores and lyrics;

(ii) a microphone (122) disposed on said front surface (123*a*) of the device to receive audio signal input;

(iii) a power ON/OFF button (130) disposed on said first side surface (123*c*) to turn on or off the display;
(iv) a first battery compartment (170) disposed on said bottom surface (123*b*), wherein one or a plurality of batteries reside inside to provide power to the display;
(v) an electronic storage (172) disposed inside the display as storage place for hymn music scores and lyrics;
(vi) a receiver (174) disposed inside the display; and
(vii) a display microprocessor (176) disposed inside the display, wherein the display microprocessor is operatively connected to said touch screen, microphone, battery compartment, storage, power ON/OFF button and receiver;
(b) a remote controller (250) wherein the remote controller has a top surface (260) and bottom surface (270), the remote comprising:
(i) a transmitter (252), wherein said receiver is configured to receive signals from the transmitter;
(ii) a zoom-in button (262), a zoom-out button (263), a scroll-up button (264), a scroll-down button (265), a flip-forward button (266), a flip-backward button (267), wherein all the buttons are disposed on the top surface (260);
(iii) a second battery compartment (271) disposed on the back surface (270) of the remote control, wherein one or a plurality of batteries reside inside to provide power to the remote control;
(iv) a remote control microprocessor (280) operatively connected to each of the transmitter (282), zoom-in button, zoom-out button, scroll-up button, scroll-down button, flip-forward button and flip-backward button;

wherein:
the remote control microprocessor is configured to receive input signal from zoom in button, zoom out button, scroll up button, scroll down button, flip forward button or flip backward button, whereupon the remote control microprocessor generates an output command of zoom-in, zoom-out, scroll-up, scroll-down, flip-forward or flip-backward to the transmitter, the transmitter then sends a corresponding transmitter signal to the display receiver; and
the display microprocessor is configured to receive an audio input from said microphone during a music session of group gathering, analyze the audio characteristics of the input, compare to the stored hymn scores within said storage, find a best match within the storage, present the best match to the touch screen; wherein said display receiver is configured to receive signal of zoom in, zoom out, scroll up, scroll down, flip forward or flip backward from said remote controller transmitter, forward the received signal to the display microprocessor, whereupon the microprocessor generates an output command to the touch screen to zoom in, zoom out, scroll up, scroll down, flip forward or flip backward the hymn songs and lyrics on the screen.

* * * * *